United States Patent [19]

Kudo et al.

[11] Patent Number: 5,059,759
[45] Date of Patent: Oct. 22, 1991

[54] LASER BEAM MACHINE

[75] Inventors: Takayuki Kudo; Kunihiko Sato; Shigehiro Yoshiyasu; Tatsuya Hirosaki; Manabu Kubo; Hajime Imaizumi, all of Aichi, Japan

[73] Assignee: Mitsubishi Denki K.K., Tokyo, Japan

[21] Appl. No.: 461,505

[22] Filed: Jan. 5, 1990

[30] Foreign Application Priority Data

Jan. 9, 1989 [JP] Japan .................................. 1-2511
Feb. 23, 1989 [JP] Japan .................................. 1-43821
Dec. 12, 1989 [JP] Japan .................................. 1-320676

[51] Int. Cl.⁵ .............................................. B23K 26/08
[52] U.S. Cl. ........................... 219/121.78; 219/121.63; 219/121.67; 219/121.82
[58] Field of Search ................... 219/121.78, 121.82, 219/121.74, 121.75, 121.63, 121.64, 121.67, 121.72, 121.6, 121.88

[56] References Cited

U.S. PATENT DOCUMENTS

| 4,547,651 | 10/1985 | Marayama | 219/121.74 X |
| 4,563,565 | 1/1986 | Kampfer et al. | 219/121.72 X |
| 4,687,901 | 8/1987 | Binder et al. | 219/121.67 |
| 4,794,222 | 12/1988 | Funayama et al. | 219/121.74 X |
| 4,905,310 | 2/1990 | Ulrich | 219/121.72 X |
| 4,908,493 | 3/1990 | Susemihl | 219/121.72 X |

FOREIGN PATENT DOCUMENTS

| 0005693 | 1/1989 | Japan | 219/121.75 |
| 2028703 | 2/1980 | United Kingdom . | |
| 1215713 | 2/1987 | United Kingdom . | |

Primary Examiner—C. L. Albritton
Attorney, Agent, or Firm—Sughrue, Mion, Zinn, Macpeak & Seas

[57] ABSTRACT

In a laser beam machine comprising: a laser oscillator for generating a laser beam; a machining head for applying the laser beam, as a light spot, to a workpiece mounted on a machining table; and a control unit for controlling the movement of the machining table in an X-Y plane, the laser beam is kept inclined with respect to the workpiece in the machining direction, whereby, when the machining speed is increased, the sticking of dross to the workpiece is suppressed, and the machining speed can be increased accordingly.

7 Claims, 11 Drawing Sheets

Δℓ : AMOUNT OF MOVEMENT OF A MACHINING LENS
f : FOCAL LENGTH OF A MACHINING LENS
θ : BEAM INCIDENT ANGLE

TEMPERATURE DISTRIBUTION OF GAUSSIAN DISTRIBUTION HEAT SOURCE IN X-Y PLANE

TEMPERATURE DISTRIBUTION OF GAUSSIAN DISTRIBUTION HEAT SOURCE IN X-Z PLANE

LASER BEAM MACHINE

BACKGROUND OF THE INVENTION

This invention relates to an improvement of a laser beam machine for machining a metal workpiece with a laser beam.

FIG. 12A is a perspective view showing a conventional laser beam machine with five axes X, Y, Z, C and A, and FIG. 12B is also a perspective view showing the machining head of the apparatus. In FIG. 12, a reference numeral 1 designates a laser oscillator for generating a laser beam; 2, a laser beam machine body; 3, a machining head having a focusing lens and a machining gas nozzle; 4, a machining table; and 5, a control unit for controlling the laser oscillator and the machine body. As shown in FIG. 12B, the machining head 3 has a Z-axis moving vertically, C-axis and Z-axis, thus being able to take any posture.

FIG. 13 is a block diagram showing the arrangement of the above-described control unit 5. In FIG. 13, reference character 5a designates a memory in which machining programs have been stored; 5b, a reading device provided for the memory 5a; 5c, a buffer; 5d, a function of analyzing an instruction set in the buffer; 5e, a function of generating a move instruction according to the result of analysis by the function 5d; 5f, a motor control function of transmitting the move instruction to a drive motor; 5g, a drive amplifier; 5h, the motor; and 5i, a position detector for detecting the number of revolutions of the motor.

The operation of the conventional laser beam machine thus constructed will be described with reference to FIG. 14A. The laser oscillator 1 outputs a laser beam 6. The laser beam 6 thus outputted is reflected by a reflecting mirror 7 in the optical path, and concentrated into an optical spot at the focal point by the focusing lens 8 in the machining head 3, thus providing high energy required for machining a workpiece 9 set on a machining table 10. The laser beam thus concentrated is applied vertically to the workpiece 9 on the machining table 10, so that the temperature of the workpiece reaches the melting point where irradiated by the laser beam; that is, the workpiece is molten along the machining locus. The molten material is removed from the workpiece by jetting a machining gas to it. In FIG. 14A, reference numeral 11, an NC (numerical control) device for moving the machining table 10 in an X-Y plane. In FIG. 14B, reference numeral 12 designates an O-ring; 13, a lens retainer; 14, a machining nozzle; 15, an assist gas inlet; and 16, an assist gas.

The control unit 5 operates according to a machining program corresponding to a configuration to be machined, which is stored in the memory 5a, to drive the motor 5h, thereby to machine the workpiece as required.

When the workpiece is machined as described above, then drag lines 17 are formed in the machined surface of the workpiece 10 as shown in FIG. 15A. This will be described in more detail. The workpiece reacting with the assist gas 16 is molten by the high energy of the laser beam concentrated into the light spot reacting with the assist gas 16. The resultant molten material is caused to flow down the workpiece by the jet stream of assist gas, thus leaving as sparks 18 from the lower surface of the workpiece 9. That is, the drag lines 17 are the traces of the molten material which are formed in the cut surface of the workpiece when flowing down as was described above. The laser beam 6 is applied perpendicularly to the workpiece 9; however, it is moved in a workpiece machining direction 20. This is why the drag lines 17 are curved backwardly, or in the direction opposite to the workpiece machining direction.

The conventional laser beam machine is constructed and operated as described above. The direction of application of the laser beam is perpendicular to the surface of the workpiece 9 at all times. Therefore, the drag lines 17 are curved in the opposite direction to the machining direction with the increasing machining speed, and the sparks 18 formed are also caused to flow a relatively long distance backwardly along the lower surface of the workpiece 9. As a result, the sparks 18, i.e., the molten material will not come off the lower surface of the workpiece 9; that is, a large quantity of burr-shaped dross is stuck to the lower surface of the workpiece 9. This will make it difficult to machine the workpiece satisfactorily, and will make it impossible to further increase the machining speed.

FIG. 16 is a graphical representation indicating the relation between the machining speed V and the degree of curve L of the drag line in machining a workpiece of SPSS 1 mm in thickness with a focusing lens having focal length of 9.525 cm and a 1 kW laser beam applied perpendicularly to the workpiece. As is apparent from FIG. 16, as the machining speed V increases, the degree of curve L of the drag line is increased. At a machining speed of 14 m/min, the degree of curve L is as large as 0.8 mm. In this case, the sparks 18 appearing on the lower surface of the workpiece will flow a relatively long distance in the opposite direction to the machining direction 20 being substantially in parallel with the lower surface of the workpiece. As a result, the molten material appearing as the sparks 18 is fixedly stuck to the lower surface of the workpiece. Thus, under the above-described conditions, the machining speed is limited to 14 m/min. As is apparent from the above description, in the conventional technique in which the incident angle of the laser beam to the workpiece is 90°, the increase of the machining speed V is limited to some extent with the laser output increased.

In the above-described conventional laser beam machine, the positional relationship between the machining head and the workpiece 9 is maintained unchanged during machining. Therefore, in the case of cutting a configuration including curves, it will take a lot of time to form the machining program. Accordingly, a configuration to be cut is limited to a straight line or a simple one consisting of straight lines. This is another difficulty accompanying the conventional laser beam machine.

SUMMARY OF THE INVENTION

Accordingly, an object of this invention is to eliminate the above-described difficulties accompanying a conventional laser beam machine.

More specifically, an object of the invention is to provide a laser beam machine in which the quantity of dross is decreased which may be stuck to the workpiece when the machining speed is increased; that is, the machining speed can be increased, and with a given machining program read, the laser beam is applied to the workpiece at a predetermined angle with the machining direction at all times.

The foregoing object and other objects of the invention have been achieved by the provision of a laser beam machine comprising a laser oscillator for generating a laser beam, a machining head for concentrating the laser beam and applying the laser beam thus concentrated to a workpiece, a machining table on which a workpiece is mounted, and a control unit for controlling the movement of the machining table in an X-Y plane;

in which, according to one aspect of the invention, the machining head has a plurality of reflecting mirror and a focusing lens, which is movable in parallel with a machining direction in a plane perpendicular to the optical axis of the laser beam so that the laser beam applied to the workpiece by the machining head is inclined with respect to the workpiece in the machining direction; and in which, according to another aspect of the invention, the control unit has a memory for storing data such as the angles of inclination of the laser beam and an inclination correcting function of correcting the amount of inclination of the laser beam according to the machining direction and the posture of the machining head so that, when being moved according to a machining configuration, the laser beam is kept inclined in the machining direction at all times, and the control unit further comprises an inclination calculating function and a physical constant table memory to read the material and thickness of the workpiece and a machining speed from the machining program thereby to determine the most suitable angle of inclination.

A technique of inclining a laser beam with respect to a workpiece has been disclosed by Japanese Patent Application (OPI) No. 289367/1987 (the term "OPI" as used herein means an "unexamined published application"). In the technique, in order to prevent the difficulty that, in machining a high reflecting material with a laser beam, the laser beam is returned to the laser oscillator being partially reflected from the surface of the high reflecting material, thus increasing the stimulated emission of the laser beam, whereby the output produced becomes too high to be controlled, the angle of application of the laser beam to the workpiece is so controlled to be other than right angles. Therefore, the technique is similar to the present invention in that the laser beam is inclined with respect to the workpiece. However, the technique is fundamentally different from the present invention in the following points for instance:

(1) The object of the prior art disclosed by the Japanese Patent Application (OPI) No. 289367/1987 is different from that of the present invention. The material handled by the prior art is limited to the high reflecting material only.

(2) The prior art, having no machining program analyzing function, cannot adjust the posture of the machining head in cutting a curve, whereas the laser beam machine of the invention has a machining program analyzing function, thus being able to smoothly change the posture of the machining head in cutting such a curve.

(3) The laser beam machine of the present invention can change the angle of inclination of the laser beam according to the material and thickness of the workpiece and the machining speed, whereas the prior art has no such function.

With the laser beam machine of the invention, the laser beam is inclined at a predetermined angle in the machining direction at all times. As a result, the degree of curve of drag lines is reduced, and the quantity of dross stuck to the workpiece is deceased, whereby the machining speed can be increased as much. Furthermore for the same reason, the machining configuration is not limited, with the result that the machining productivity is greatly improved. In addition, in the laser beam machine of the invention, the angle of inclination of the laser beam can be determined best according to the material and thickness of the workpiece and the machining speed. Therefore, with the laser beam machine, even an operator not skilled in the laser beam machining operation can machine workpieces with high accuracy, and relatively thick workpieces can be machined with ease.

The nature, principle and utility of the invention will become more apparent from the following detailed description and the appended claims when read in conjunction with the accompanying drawings, in which like reference numerals or characters designate like parts.

DETAILED DESCRIPTION OF THE EMBODIMENTS

Figure 1:
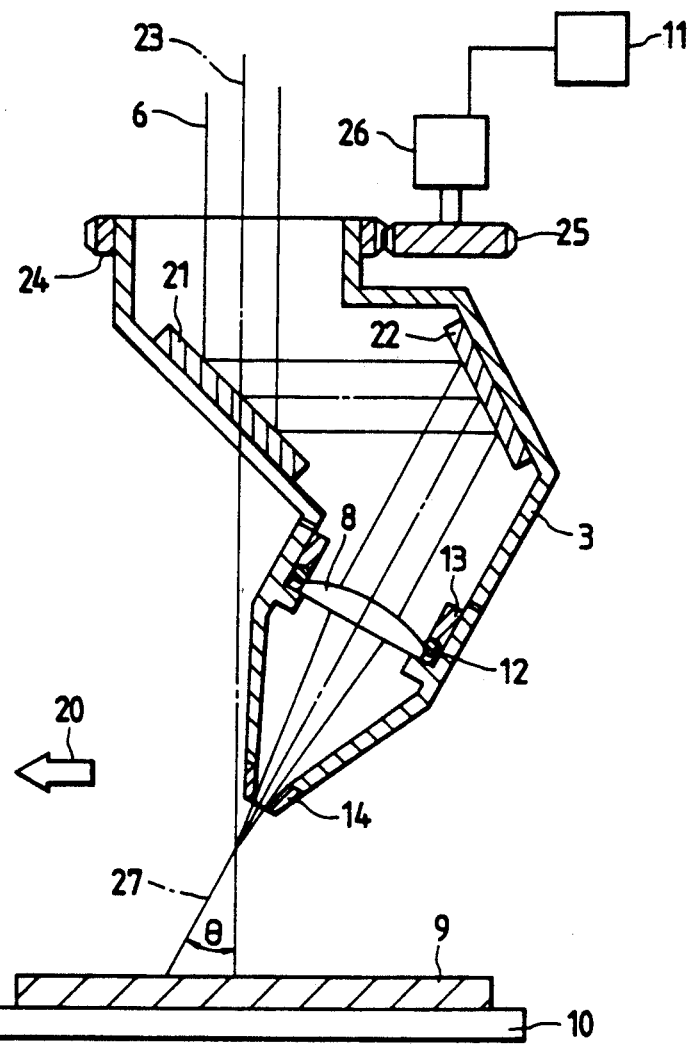
FIG. 1 is a sectional view showing the machining head of one example of a laser beam machine according to this invention.

A laser beam machine according to this invention will be described with reference to the accompanying drawings. FIG. 1 is a sectional diagram showing the machining head of a laser beam machine, a first embodiment of the invention. In FIG. 1, parts designated by reference numerals 3 through 20 correspond to those designated by the same reference numerals in the conventional laser beam machine described above. Further in FIG. 1, reference numerals 21 and 22 designate reflecting mirrors; 23, the incident optical axis of the laser beam; 24 and 25, gears; 26, an electric motor; and 27, an irradiating optical axis.

The reflecting mirrors 21 and 22 are arranged as shown in FIG. 1. More specifically, the reflecting mirror 21 is so arranged as to form 45° with the vertical incident optical axis 23 of the laser beam, and the reflecting mirror 22 is so positioned that the laser beam forms a predetermined angle $\theta$ with the incident optical axis 23. The laser beam reflected by the reflecting mirrors 21 and 22 is concentrated into a light spot by the focusing lens 8 so as to be applied to the workpiece 9.

Figure 2:
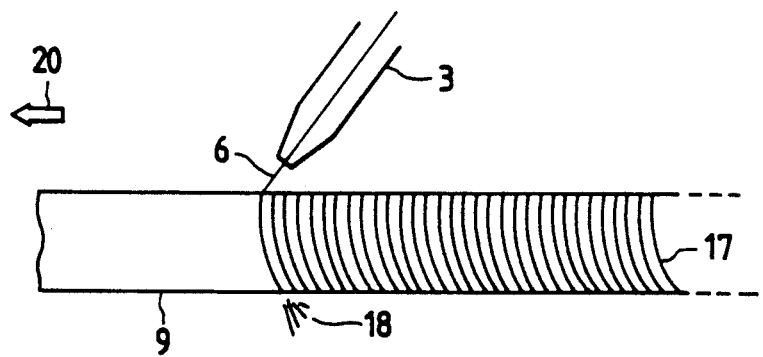
FIG. 2 is a sectional view showing the surface of a workpiece which is formed by cutting it with a laser beam.

As a result, the degree of curve of the drag lines 17 is smaller and the sparks 18 flow distance is shorter as is apparent from FIG. 2.

Figure 3:
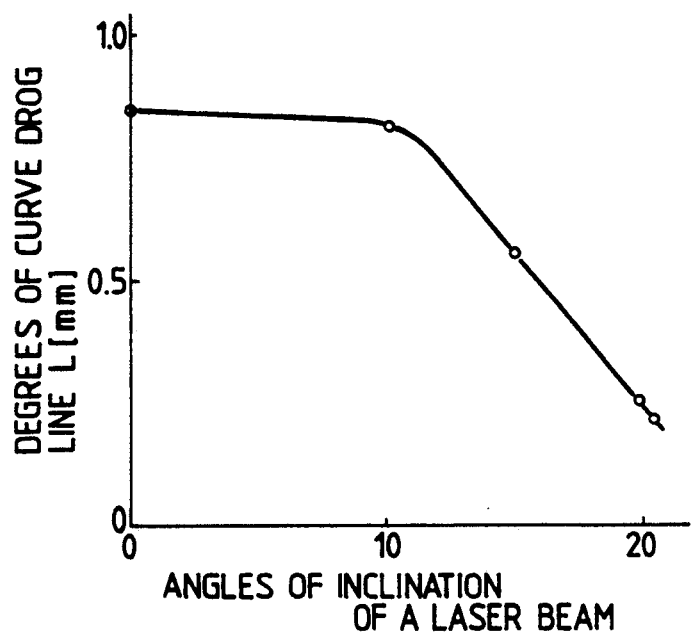
FIG. 3 is a graphical representation indicating the relationships between angles of inclination of a laser beam and degrees of curve of drag lines.
Figure 4:
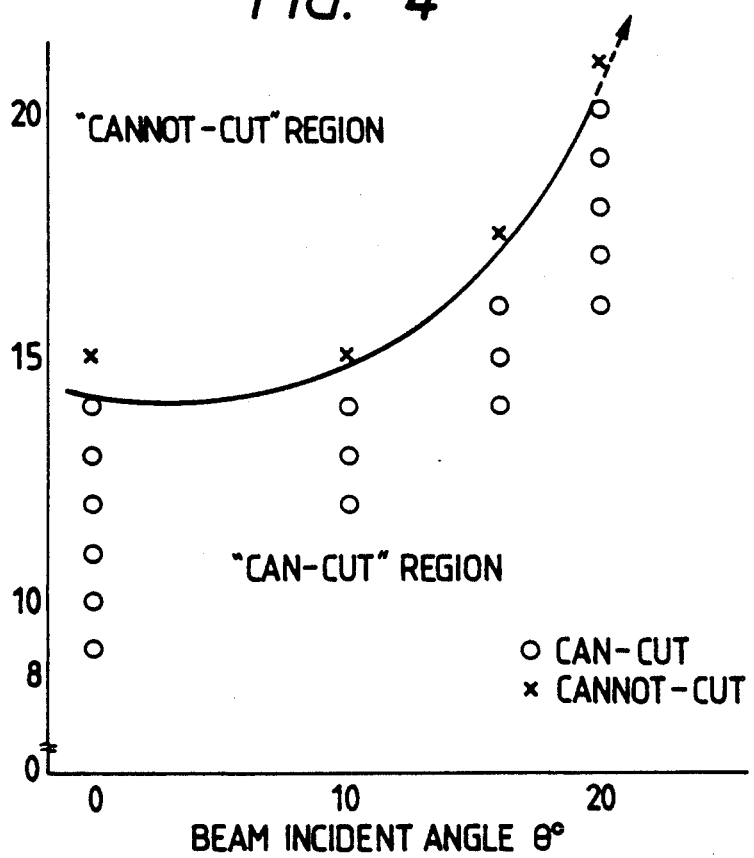
FIG. 4 is a graphical representation indicating beam inclination angle with cutting speed.

FIG. 3 is a graphical representation indicating the relationships between the degree of curve L of drag lines and the laser beam incident angle $\theta$ in the case where a workpiece of SPCC 1 mm in thickness is cut straightly under the conditions that the laser beam output is 1 kW, the focusing lens 8 has a focal length of 9.525 cm, and the machining speed is 14 m/min. As is apparent from the graphical representation, as the incident angle $\theta$ increases, the degree of curve L is decreased. FIG. 4 is also a graphical representation indicating the relationships between the incident angle $\theta$ of the irradiating optical axis and the machining speed in the case where the same workpiece is machined under the same conditions. As is apparent form FIG. 4, the limit machining speed V is proportional to the incident angle $\theta$. The above-described facts mean that machining a workpiece with the irradiating optical axis of the laser beam inclined in the machining direction is effective in increasing the machining speed, and the incident angle $\theta$ should not be smaller than 10°. And it is estimated from FIG. 3 that there is a point between 20° and 30° where the degree of curve L of drag lines is zero (0). It is ideal that the degree of curve L is zero (0). Therefore, with a machining speed of 14 m/min, the most suitable incident angle is between 20° and 30°. According to FIG. 3, with $\theta < 10°$, the maximum allowable machining speed is higher. However, it cannot be ensured that the maximum allowable machining speed can be increased limitlessly by increasing the incident angle $\theta$. And in the case where the angle of irradiation of the laser beam with respect to the workpiece is inclined into an acute angle, the low speed machining characteristic has not been confirmed yet. However, with a practical machining speed of the order of 15 to 20 m/min, an incident angle $\theta$ of 10° to 30° is sufficiently effective. Accordingly, with an incident angle $\theta$ of 10 to 30 degrees, the conventional machining speed can be greatly increased. In FIG. 4, what is indicated by "0" is the "can-cut" region in which the machining operation can be achieved irrespective of dross and machining accuracy.

In the above-described embodiment, the workpiece is machined with the laser beam. However, the technical concept of the invention is applicable to a laser beam welding operation. In the case of a laser beam machining operation, the quantity of dross sticking to a workpiece can be reduced and the machining speed can be increased; whereas in the case of a laser beam welding operation, the depth of penetration is increased as well as the welding speed.

Furthermore, in the above-described embodiment, the workpiece is fixedly mounted on the X-Y table; however, it goes without saying that the technical concept of the invention is applicable to a laser beam machining operation in which the workpiece and the machining head are moved relative to each other.

Figure 5A:
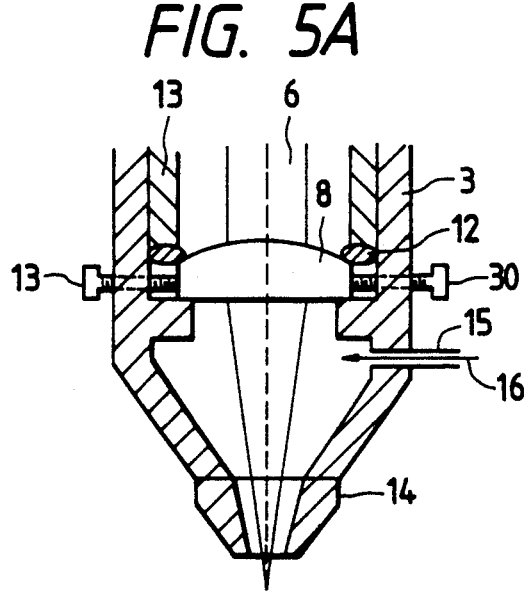
FIGS. 5A and 5B are sectional diagrams showing the machining head of a second example of the laser beam machine according to the invention.
Figure 5B:
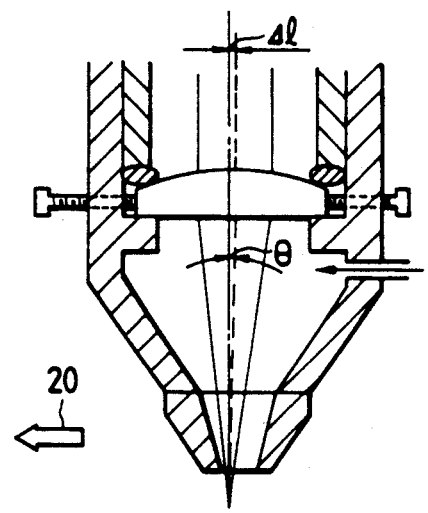
Figure 13:
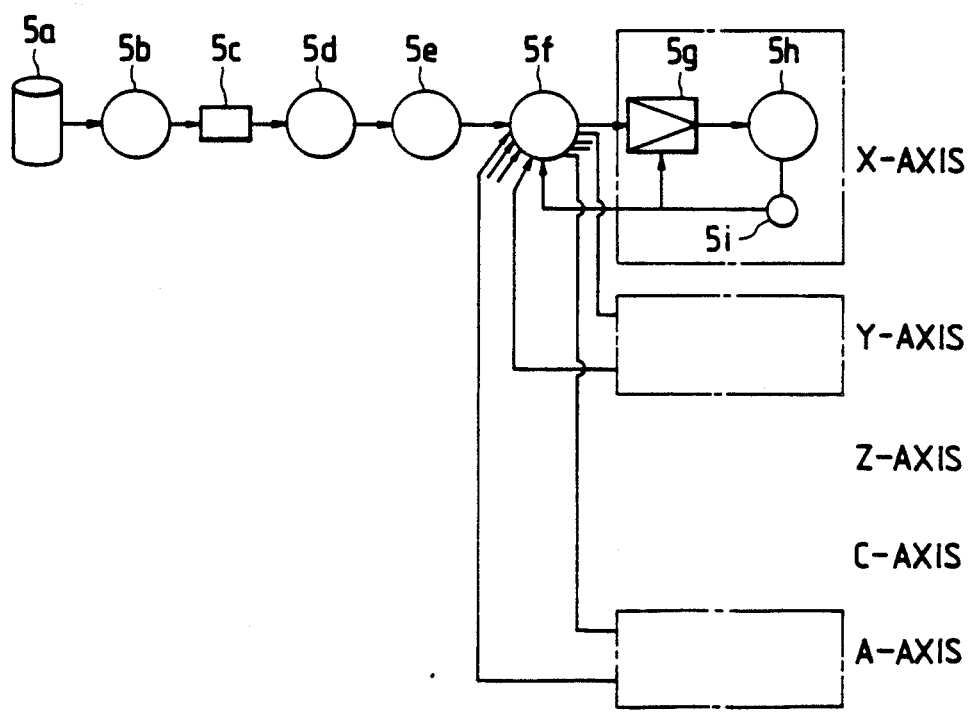
FIG. 13 is a block diagram showing the arrangement of a control unit in the machine illustrated in FIG. 12.
Figure 12A:
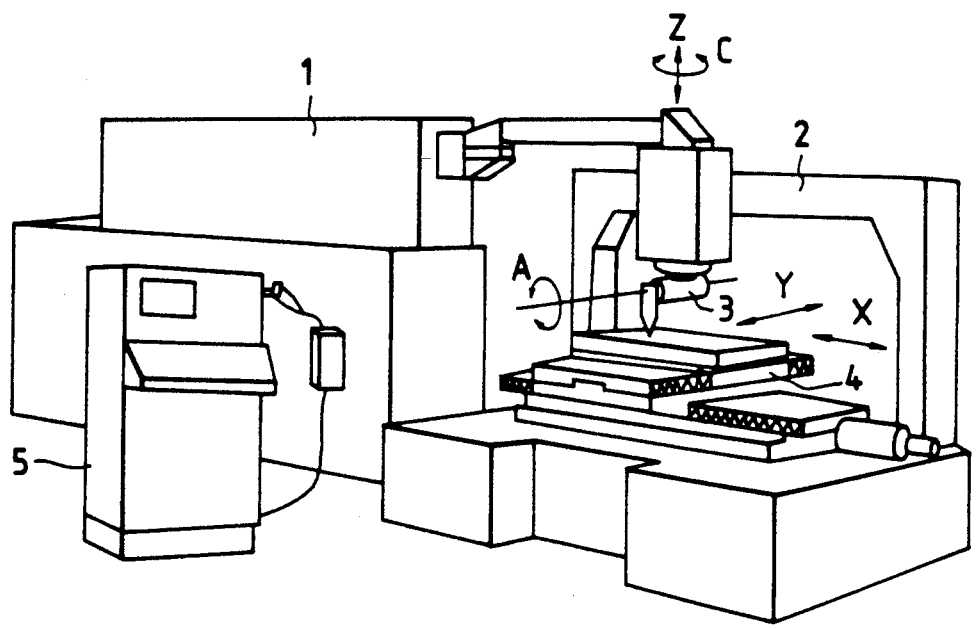
FIG. 12A is a perspective view showing the arrangement of a conventional laser beam machine.
Figure 12B:
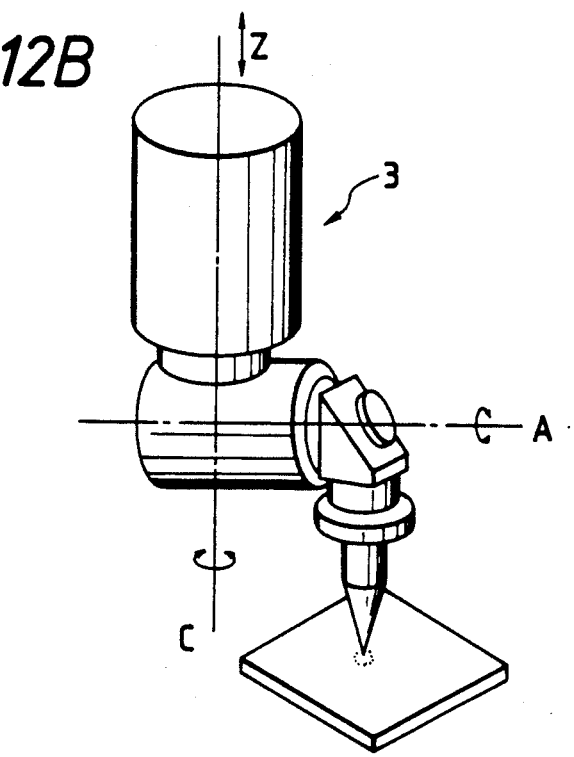
FIG. 12B is also a perspective view showing the machining head of the conventional laser beam machine.
Figure 14A:
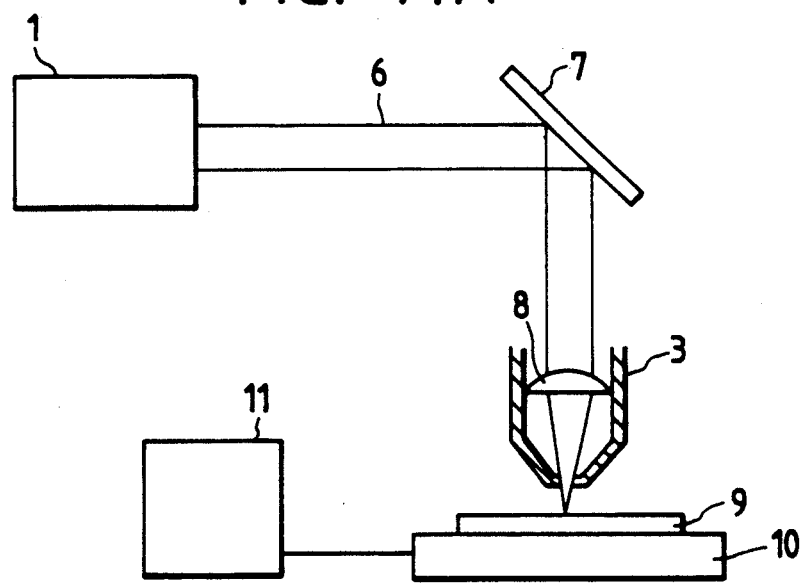
FIG. 14A is an explanatory diagram for a description of a laser beam machining operation with the conventional laser beam machine.
Figure 14B:
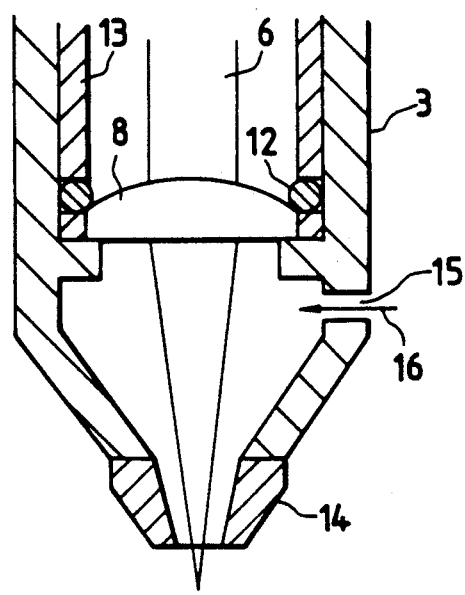
FIG. 14B is a sectional view showing the machining head of the conventional laser beam machine.
Figure 15A:
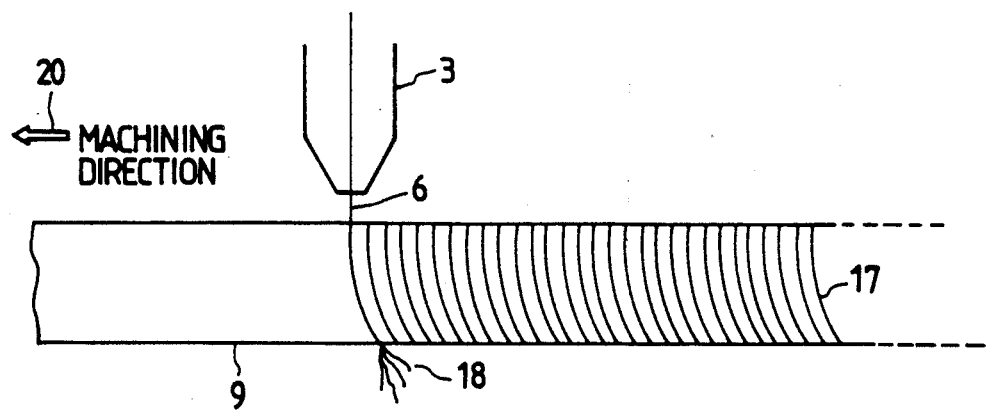
FIGS. 15A and 15B are explanatory diagrams for a description of the surface of a workpiece which is formed by cutting it with the conventional laser beam machine.
Figure 15B:
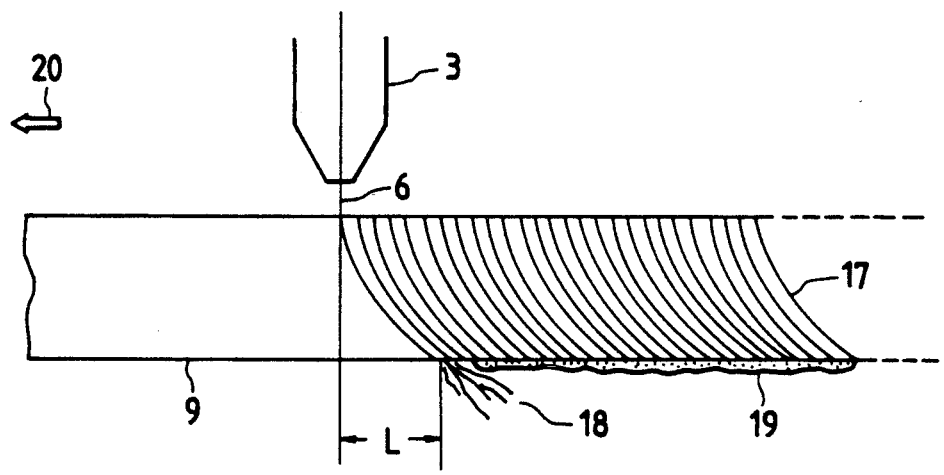
Figure 16:
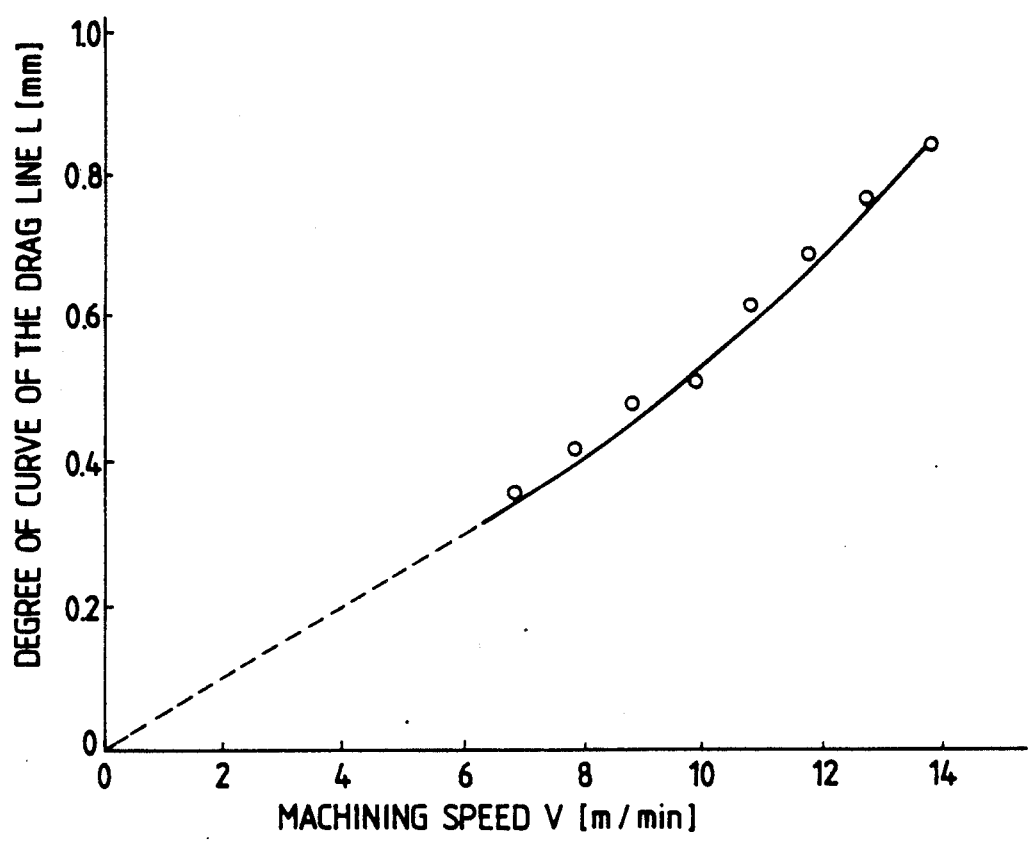
FIG. 16 is a graphical representation indicating the relationships between the cutting speed and the degree of curve of drag lines.

FIGS. 5A and 5B are sectional views showing the machining head of a laser beam machine, a second embodiment of the invention. In FIG. 5, reference numerals 3 through 20 designate the components which are equivalent to or the same as those in FIGS. 12 through 14 showing the conventional laser beam machine. Further in FIG. 5, reference numerals 30 and 31 designate machining lens moving screws.

Figure 6:
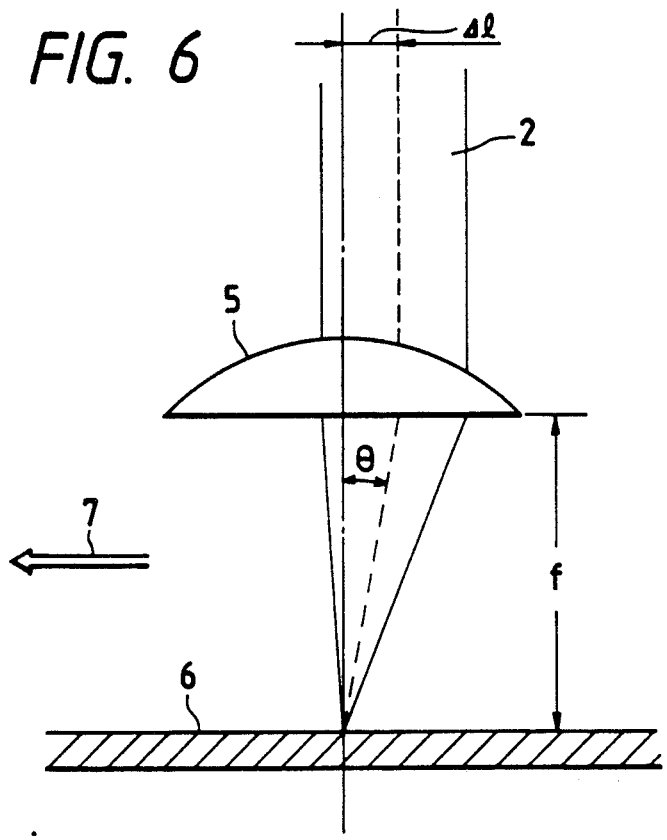
FIG. 6 is an explanatory diagram for a description of the inclination of the laser beam.

As shown in FIG. 5, the machining lens 8 can be moved with the screws 30 and 31 in parallel with the machining direction in a plane perpendicular to the optical axis of the laser beam 6. When the machining lens 8 is shifted in the machining direction 20 by operating the screws 30 and 31, the laser beam 6 concentrated by the machining lens 8 is shifted as much as $\Delta l$ from the central axis of the machining lens 8, so that the laser beam 6 is inclined as much as an angle of $\theta$ as shown in FIG. 6.

In general, the following relation is established between the amount of parallel movement of the machining lens 8 and the incident angle $\theta$ of the beam:

$$\Delta l / f = \tan \theta$$

where f is the focal length of the machining lens. For instance when a machining lens having a focal length (f) of 9.525 mm is used and the incident angle ($\theta$) is set to 20°, $$\begin{aligned} \Delta l &= 9.525 \text{ mm} \times \tan 20° \\ &= 34.7 \text{ mm} \end{aligned}$$

it is necessary to move the machining lens as much as 34.7 mm in the machining direction.

Figure 7:
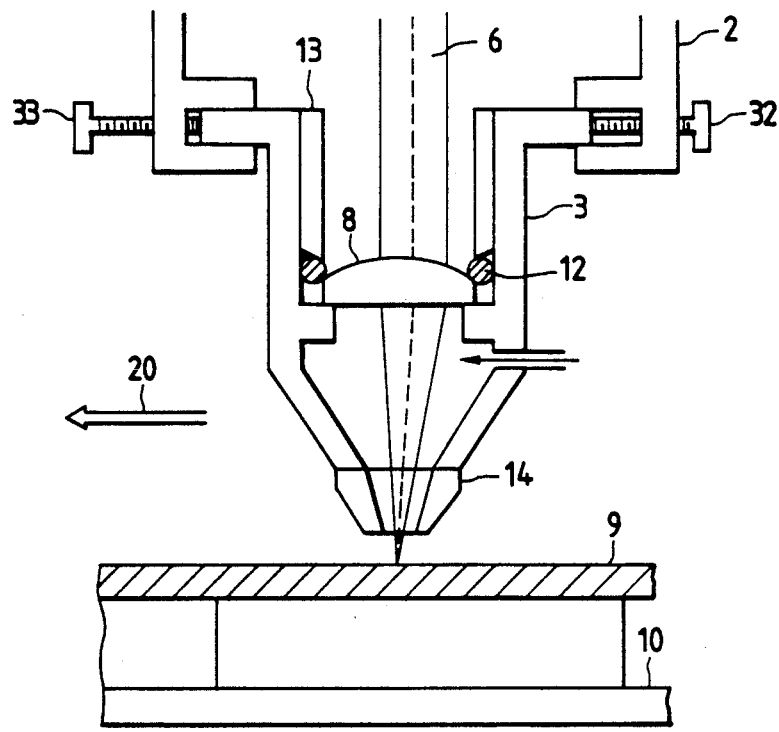
FIG. 7 is a sectional diagram showing the machining head of a third example of the laser beam machine according to the invention.

In the case where the incident angle is small as shown in FIG. 5 or 6, the inclination of the laser beam is not so effective in machining a workpiece. Therefore, the machining lens should be moved beyond the range of fine adjustment, and the laser beam machine may be so designed that the machining head 3 itself is moved in parallel as shown in FIG. 7. More specifically, in the laser beam machine shown in FIG. 7, the machining head 3 can be moved with machining head moving screws 32 and 33 in parallel with respect to the machine body 2. That is, in this case also, the same effect can be obtained with the laser beam inclined in the machining direction.

Referring back to FIG. 1, the machining head 3 has a gear 24 around its cylindrical upper end portion. The gear 24 is engaged with a gear 25 mounted on the output shaft of an electric motor 26. The motor 26 is controlled by an NC (numerical control) device 11 so that the machining head 3 is turned around the incident optical axis 23 of the laser beam, whereby whenever the machining direction is changed, the machining head 3 is turned by the operator so that the laser beam is maintained inclined in the machining direction at all times.

Figure 8:
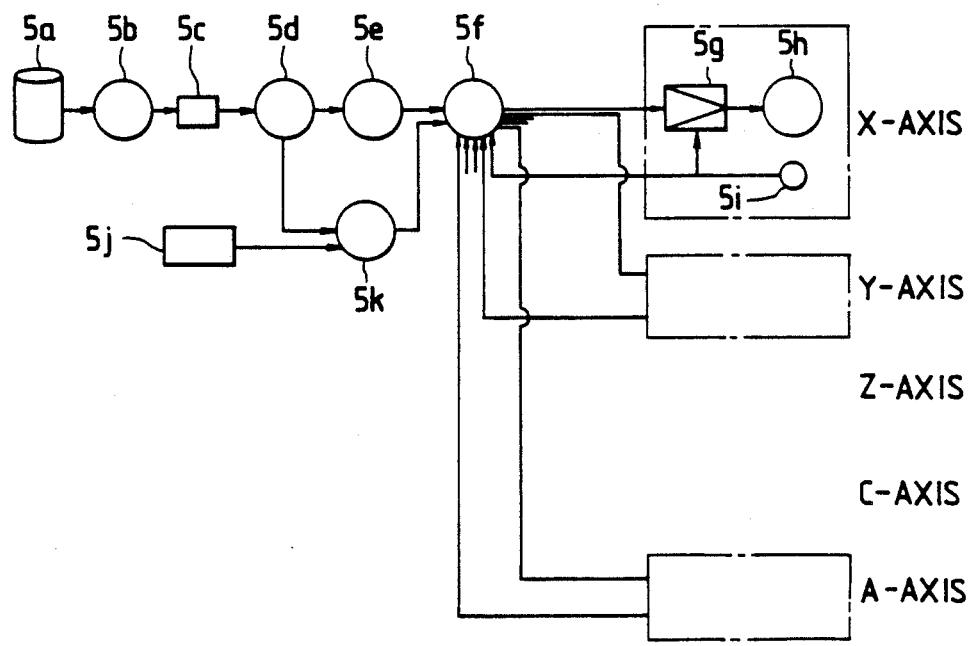
FIG. 8 is a block diagram showing one example of a control unit the laser beam machine according to the invention.

FIG. 8 is a block diagram showing the arrangement of a control unit for maintaining the laser beam 6 inclined in the direction of movement of the latter at all times. In FIG. 8, reference characters 5a through 5i designate the components which are equivalent to or the same as those in FIG. 13; FIG. 13 are therefore designated. Further in FIG. 8, reference character 5j designates a memory for storing data such as an angle of inclination to be formed with the direction of movement of the laser beam; and 5k, an inclination correcting function of calculating amounts of corrections to be given to the axes from the present posture and the present angle of inclination.

Figure 9A:
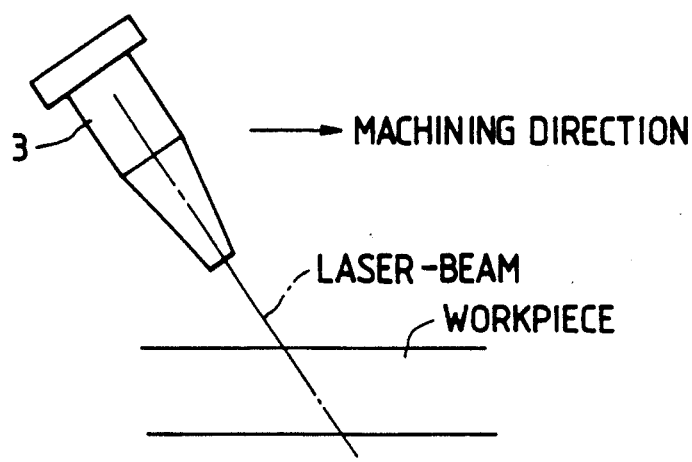
FIG. 9A is a side view showing the positional relationship between the laser beam and the workpiece.
Figure 9B:
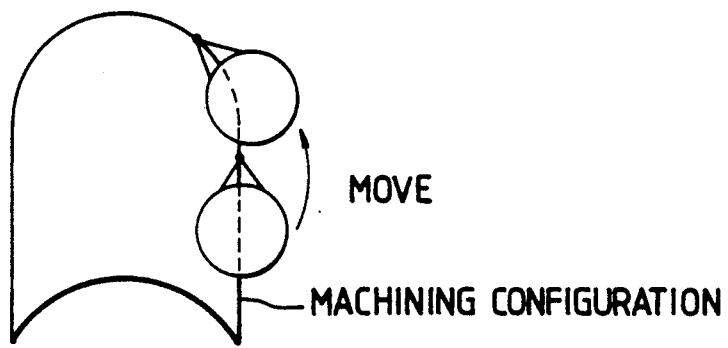
FIG. 9B is an explanatory diagram snowing the movement of the laser beam.

In the control unit 5, the program read function 5b operates to read a machining program out of the memory 5a, and temporarily store it in the buffer 5c, and the instruction analyzing function 5d operates to read from the buffer 5c the coordinates of a machining start point and a machining end point, and a machining movement mode such as a straight movement mode or arcuate movement mode. According to those data, the move instruction generating function 5e calculates an amount of movement to be carried out for a predetermined period of time, and applies it to the motor control function 5f. On the other hand, the inclination correcting function 5k operates to read the amount of inclination from the memory 5j, and calculate a correcting vector from the machining start point and the machining end point provided by the instruction analyzing function 5d, and apply those data to motor control function 5f. In cutting a curve, a correcting vector is formed in a direction tangent to the arc. The motor control function 5f applies the position instructions of the motor 5h to the servo amplifiers 5g according to the given move instruction and correcting level. Thus, as shown in FIG. 9A, the machining head is moved while forming a predetermined angle with the direction of movement at all times. In the embodiment, the correcting vector is applied to the motor control function 5f; however, it may be applied to the move instruction generating function 5e.

Furthermore in the above-described embodiment, the angle of inclination of the laser beam 6 with respect to the workpiece 9 is the data stored in the memory 5a, which is rewritten whenever the material, thickness, and machining speed are changed; however, it may be read from the machining program.

Figure 10A:
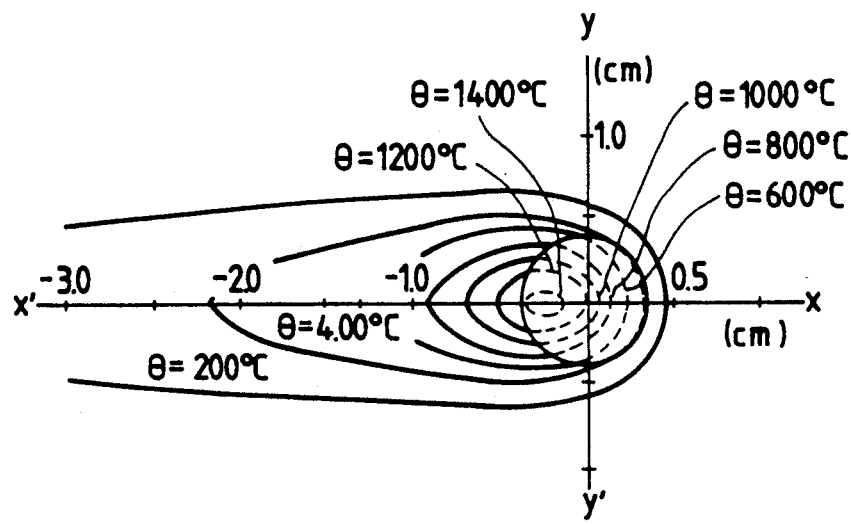
FIGS. 10A and 10B are a plan view and a side view for a description of the heating of the workpiece with the laser beam.
Figure 10B:
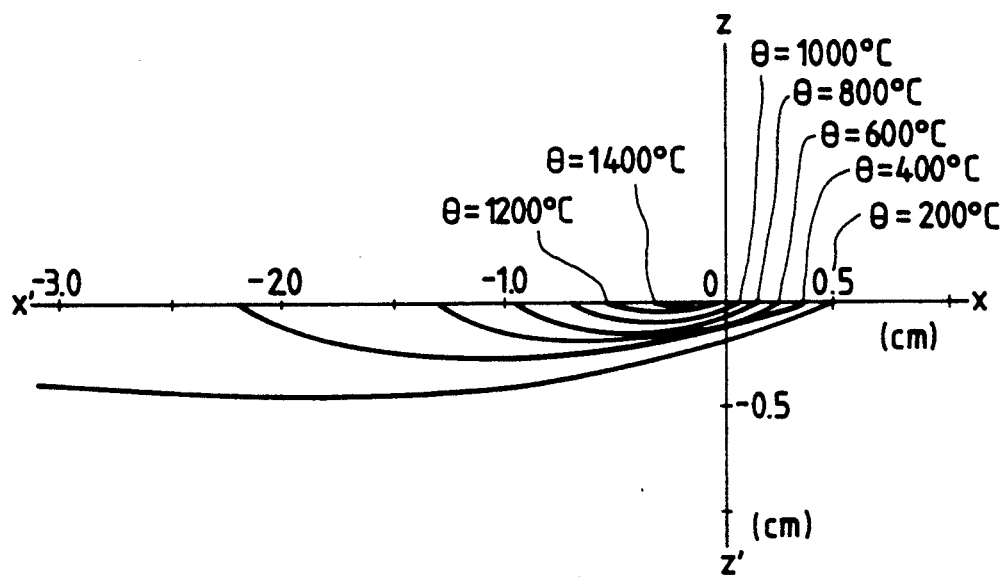

The cutting laser beam focused by the focusing lens is applied to the workpiece. In this case, the intensity of the laser beam is of Gaussian distribution. Therefore, the laser beam thus focused can be regarded as a moving light spot. In addition, the temperature distribution of the laser beam shows temperature difference in the direction of thickness of the workpiece as illustrated in FIG. 10. If the temperature difference is large, then in the workpiece a part irradiated with the laser beam and another part below it are not molten at the same time. On the other hand, when the laser beam is inclined in the machining direction, the workpiece is preheated in the machining direction; that is, the laser beam thus inclined preheats the part which is located below the part irradiated by it, as a result of which the above-described melting time difference is reduced. Thus, the workpiece can be cut with high accuracy.

In general, with respect to the diffusion of heat upon application of a laser beam, the following equation is established:

$$r = 4\sqrt{k \cdot t}$$

where r is the distance between the heated point and the irradiated point, k is the thermal diffusivity, and t is the time which has elapsed from the irradiation of the laser beam. The time t required for the beam to advance the distance r is:

$$t = r/v$$

where v is the machining speed.

Therefore, $r = 4\sqrt{k \cdot r/v}$

That is, $r = 16 \, k/v$

Figure 11:
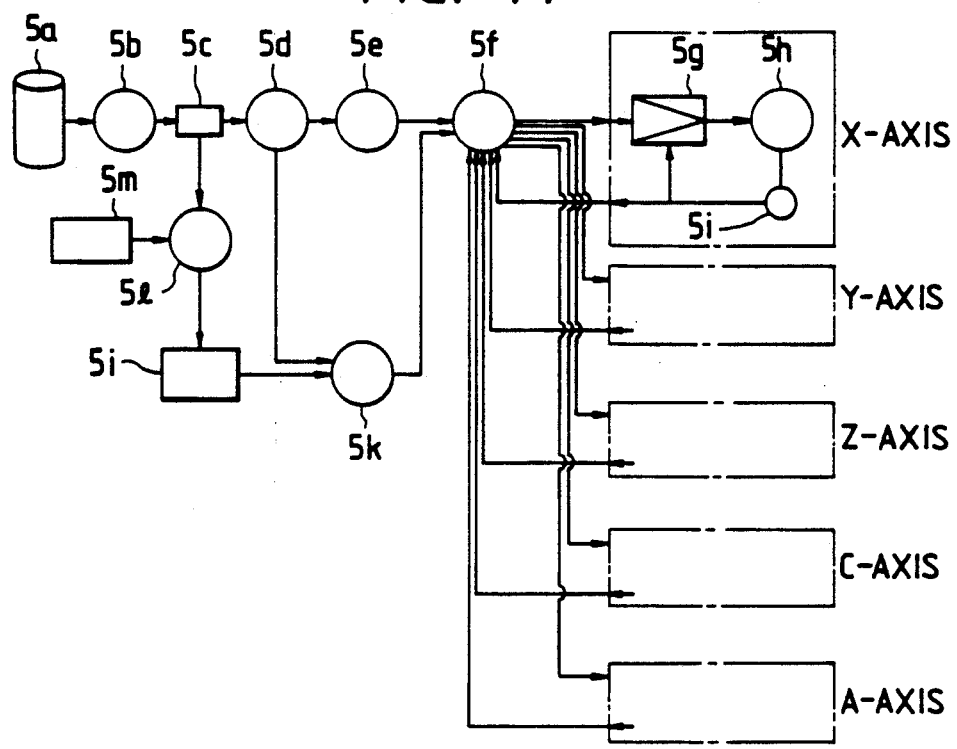
FIG. 11 is a block diagram showing another example of the control unit in the laser beam machine.

FIG. 11 is a block diagram showing the arrangement of another example of the control unit in the laser beam machine which is so designed as to obtain the angle of inclination of the laser beam from the material and thickness of a workpiece and the machining speed. In FIG. 11, reference characters 5a through 5k designates the components which are equivalent to or the same as those in FIG. 8. Further in FIG. 11, reference character 51 designates an inclination calculating function operating to read necessary data from the buffer 5c and to calculate an amount of correction, and to apply the data to the memory 5j; and 5m, a physical constant table memory for storing the thermal diffusivities of a plurality of materials.

Similarly as in the above-described case, a given instruction is analyzed, and commands are applied to the motor drive amplifiers. The inclination calculating function 51 operates as follows: The function 51 reads the material and thickness of a workpiece from the machining program stored in the buffer 5c, and search the physical constant table memory 5m for a thermal diffusivity k according to the material thus read, and to obtain the time t when the heat transfer rate becomes substantially stable by inserting the thermal diffusivity k and the machining speed v into the following equation:

$$t = 16 \, k/v^2$$

The inclination calculating function 51 further operates to obtain the distance r corresponding to the substantially stable state by inserting the time t thus obtained into the following equation:

$$r = v \, t$$

and to compare the distance r with the thickness T of the workpiece to calculate a correcting angle θ and store it in the memory 5j. Thus, the angle of inclination can be automatically determined from the machining program according the material and thickness of a workpiece and the machining speed.

As was described above, in the laser beam machine, the laser beam is inclined with respect to the workpiece in the machining direction, according to the invention, as a result of which the curving of the drag lines backwardly is suppressed, and the machining speed can be increased accordingly.

Furthermore, in the laser beam machine according to the invention, during machining, the machining program is read so as to maintain the angle of inclination of the laser beam unchanged at all times. Therefore, with the laser beam machine of the invention, any configuration can be cut, and the laser beam machining operation can be achieved with high productivity.

In addition, in the laser beam machine of the invention, the material and thickness of a workpiece and the machining speed are read from the machining program so that the most suitable angle of inclination of the laser beam is automatically selected with respect to the workpiece. Therefore, with the laser beam machined of the invention, workpieces can be machined even by an operator not so skilled in the laser beam machining operation, and relatively thick workpieces can be readily machined with high accuracy.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A laser beam machine comprising:
   a laser oscillator for generating a laser beam;
   a machining head for concentrating said laser beam and applying said laser beam thus concentrated to a workpiece;
   a machining table on which said workpiece is mounted;
   a control unit for controlling the movement of said machining table in an X-Y plane; and
   laser beam inclining means for inclining said laser beam which said machining head applies to said workpiece with respect to said workpiece in a machining direction, said inclination being dependent upon said workpiece and machining speed to reduce dross buildup on said workpiece during machining.

2. A laser beam machine according to claim 1 in which said laser beam inclining means comprises:
   a plurality of reflecting mirrors; and
   a focusing lens built in said machining head.

3. A laser beam machine according to claim 2, in which one of said reflecting mirrors is so arranged as to form 45° with the vertical incident optical axis of the laser beam, and the other one of the reflecting mirrors is so positioned that the laser beam forms a predetermined angle $\theta$ with the incident optical axis.

4. A laser beam machine according to claim 1, in which said laser beam inclining means comprises:
   a focusing lens built in said machining head; and
   a plurality of screws for moving said focusing lens in parallel with the machining direction in a plane perpendicular to the optical axis of said laser beam.

5. A laser beam machine comprising:
   a laser oscillator for generating a laser beam;
   a machining head for concentrating said laser beam and applying said laser beam thus concentrated to a workpiece;
   a machining table on which said workpiece is mounted;
   a control unit for controlling the movement of said machining table in an X-Y plane; and
   laser beam inclining means for inclining said laser beam which said machining head applies to said workpiece with respect to said workpiece in a machining direction;
   wherein said laser beam inclining means comprises a focusing lens built in said machining head; and
   a plurality of screws for moving said machining head in parallel with the machining direction in a plane perpendicular to the optical axis of said laser beam.

6. A laser beam machine comprising:
   a laser oscillator for generating a laser beam;
   a machining head for concentrating said laser beam and applying said laser beam thus concentrated to a workpiece;
   a machining table on which a workpiece is mounted; and
   a control unit for controlling the movement of said machining table in an X-Y plane,
   in which said control unit for controlling the movement of said machining table has a machining program analyzing function to analyze a predetermined machining program during machining, to maintain said laser beam inclined in a machining direction according to a machining configuration at all times.

7. A laser beam machine as claimed in claim 7, in which said control unit further comprises an inclination calculating function and a physical constant storing function, to change said inclination of said laser beam according to the material and thickness of said workpiece and a speed of machining said workpiece.

* * * * *